US005402047A

United States Patent [19]

Bresson et al.

[11] Patent Number: 5,402,047
[45] Date of Patent: Mar. 28, 1995

[54] COMPACT DEVICE FOR CONTROLLING A MOTOR UNIT WHICH DISPLACES A SCREENING ELEMENT

[75] Inventors: Rene G. Bresson, Mantoche; Thierry J. Genin, Gray; Jean E. Giraud, Arc les Gray, all of France

[73] Assignee: SIMU, Gray, France

[21] Appl. No.: 89,510

[22] Filed: Jul. 21, 1993

[51] Int. Cl.⁶ .................... H02P 1/22

[52] U.S. Cl. .................... 318/287; 318/256; 318/267

[58] Field of Search .................... 318/16, 480, 434, 53, 318/469, 267, 468, 280, 287, 282, 255-256; 160/5, 330, 331; 361/33, 21

[56] References Cited

U.S. PATENT DOCUMENTS

| | | | |
|---|---|---|---|
| 4,490,796 | 12/1984 | Bigbie et al. | 364/519 |
| 4,618,804 | 10/1986 | Iwasaki | 318/16 |
| 4,956,588 | 9/1990 | Ming | 318/16 |
| 4,958,112 | 9/1990 | Zerillo | 318/16 |
| 4,994,724 | 2/1991 | Hsu | 318/468 |
| 5,081,402 | 1/1992 | Koleda | 318/16 |

FOREIGN PATENT DOCUMENTS 90031806 5/1991 Germany .

OTHER PUBLICATIONS

WO-A-8 604 109 (Karl Rasmussen Industri) p. 6, line 4-p. 11, line 29; FIGS. 1, 2.

4th IECI Annual Conference Procedings 20 Mar. 1978, Philadelphia, Pa. pp. 126-221, Kamiyama et al "microprocessor-controlled fast-response speed regulator for thyristorized reversible regenerative dcm drives".

*Primary Examiner*—William M. Shoop, Jr.
*Assistant Examiner*—John W. Cabeca
*Attorney, Agent, or Firm*—Dowell & Dowell

[57] ABSTRACT

A device for controlling a motor unit which displaces a screening unit which includes a power supply with at least one controlled electronic switch designed to feed a regulated electrical output to the motor unit and a control loop with a circuit which detects the difference between the value of the electrical output produced by the power supply and a reference value, and wherein the reference value is selected for the electrical output as a function of input signals received by the device.

10 Claims, 3 Drawing Sheets

COMPACT DEVICE FOR CONTROLLING A MOTOR UNIT WHICH DISPLACES A SCREENING ELEMENT

BACKGROUND OF THE INVENTION

The present invention is concerned with the technical field of equipment designed to control a motor unit which displaces a screening element, in the general sense of the meaning, such as a rolling shutter or blind installed on a window or door, for example.

More specifically, the invention refers to a device for controlling a motor unit associated with a Venetian blind with orientable slats.

DESCRIPTION OF PRIOR ART

The state of the art has offered numerous technical solutions for controlling the operation of a screening element. The simplest solution consists of using a manual control, such as a crank or cord, in order to operate the screening element.

An automated solution for displacing the screening element consists of making use of a motor unit, and is associated with a geared motor coupled to the screening element. Normally, the motor unit is connected by power supply cables to a control switch placed near the screening element which can be operated to control the motor unit in either of its two rotating directions.

In numerous applications, a remote control is needed to control the motor unit associated with the screening element. To this end, U.S. Pat. No. 4,618,804 describes how an infrared remote control can be used to control the motor unit which is associated with a control unit connected to the means for discriminating the control signals received by an infrared receiver.

U.S. Pat. No. 4,956,588 also relates to a device for remotely controlling two motor units associated with a Venetian blind type of screening element with orientable slats. One of the motor units is coupled to the slat orientation cord, whereas the other motor unit is connected to the cord which allows the blind to be rolled up or down.

The motor units are associated with an infrared receiver which permits the discrimination of the input signals received.

Practical experience shows that the use of an automatic control for a motor unit, such as that described above, results in a device with a considerable overall dimension, often involving a complex assembly, wherein the actual and effective concealment of the device. Such a constraint is particularly important for a device which has the purpose of controlling two motors linked to a Venetian blind with orientable slats.

SUMMARY OF INVENTION

The present invention aims to correct the drawbacks described above by a device for controlling a motor unit which displaces a screening element. The device is designed to allow it to be easily assembled with the motor unit, while actually allowing it to be concealed because of its small overall dimension.

The invention also aims to offer a control device capable of controlling a single motor unit according to one or two rotating speeds and according to its two rotating directions, so that the device can control a straight blind or Venetian blind with orientable slats.

To achieve these objectives, the control device comprises:

means for receiving the control signals allowing the motor to be controlled according to at least one rotating speed and two rotating directions;

means for discriminating the control signals received;

and a motor unit control control unit, controlled by the discrimination means.

According to the invention, the device comprises:

a regulated DC power supply with at least one controlled electronic switch designed to feed a regulated electrical output to the motor unit, by means of the control unit;

a DC power supply regulator with one circuit which detects the difference between the value of the electrical output produced by the DC power supply and a reference value for the electrical output, of the same type as that produced by the DC power supply, the detection circuit controlling the switch's control circuit so that the output magnitude of the DC power supply reaches a value equal to that of the reference magnitude;

and means for selecting the electrical output's reference value as a function of the control signals received.

According to an advantageous characteristic, the selection means select the reference value among at least two values corresponding, respectively, to a high and low rotating speed of the motor unit. According to this characteristic, the device is designed to control the motor unit associated with a Venetian blind with orientable slats.

Various other features are revealed in the description given above in reference to the attached drawings which show embodiments of the invention by way of nonlimiting examples.

DESCRIPTION OF THE PREFERRED EMBODIMENT

Figure 1:
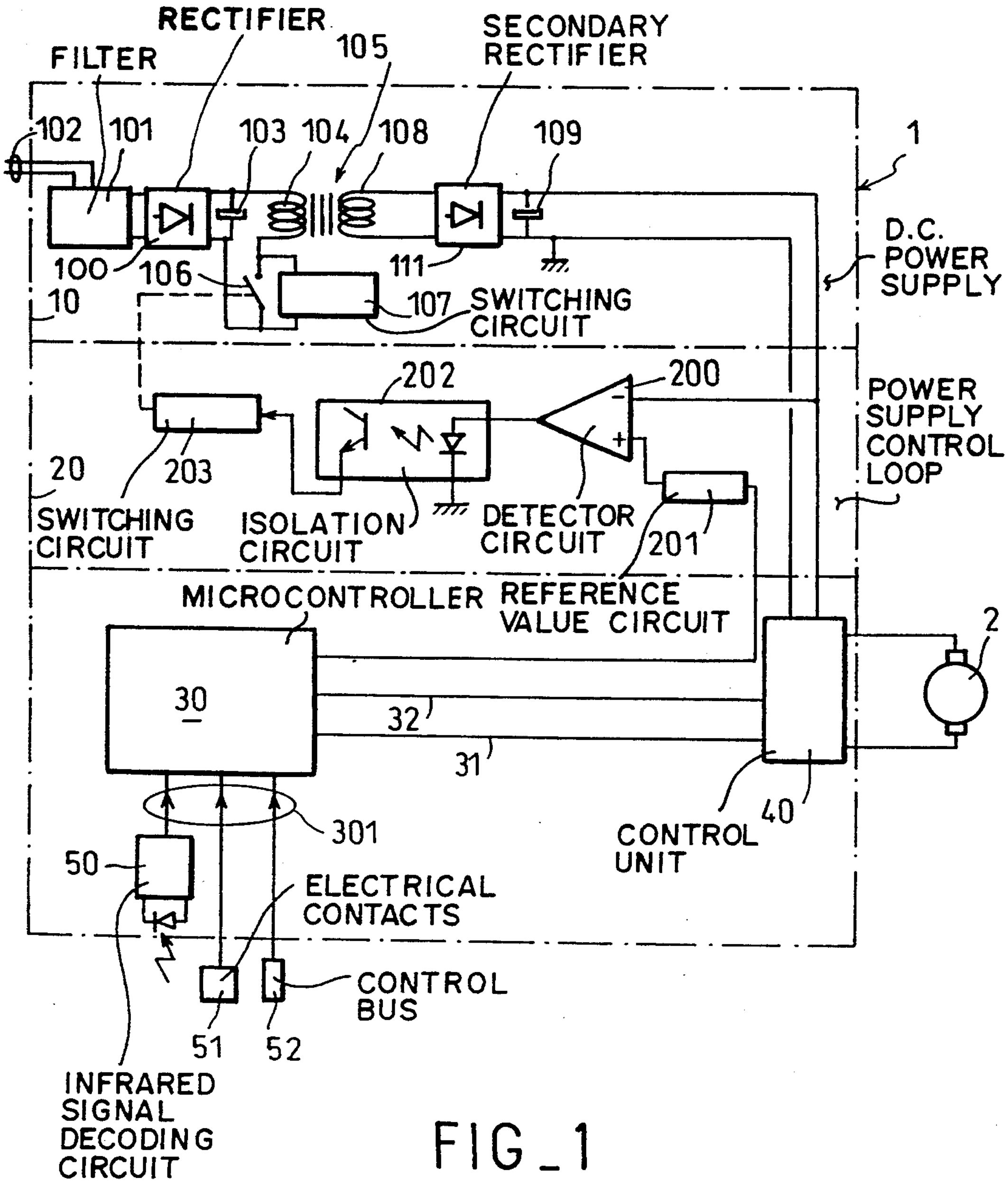
FIG. 1 is a functional diagram of the control device according to the invention, for a motor unit linked to a screening element.

As revealed in FIG. 1, the control device according to the invention, designated by reference numeral 1, is designed to control a motor unit (2), preferably of the DC type and coupled by any known means to a screening element, in the general meaning of the term (not depicted). The control according to the invention comprises a DC power supply (10), a DC power supply control loop (20), a microcontroller (30) and a motor control unit (40).

The DC power supply (10) comprises a rectifier stage (100), powered by means of a filter (101) through a single phase electrical supply network (102). The output of the rectifier stage (100) is connected via capacitor (103) to a primary winding (104) of a transformer (105). A controlled electronic switch (106) is serial-connected between the output of the rectifier stage (100) and the primary winding (104). The electronic switch (106), such as a transistor which is used for switching operations, is linked to a switching support circuit (107).

The transformer (105) comprises a secondary winding (108) connected, by means of a secondary rectifier (111), to an output capacitor (109), one of the terminals of which is grounded. The output of the secondary rectifier (111) feeds the control unit (40) via a DC electrical output.

The regulation loop (20) comprises a detection circuit (200), linked to the output terminal of the rectifier (111), which is not grounded. The circuit (200) detects the difference between the value of the electrical magnitude produced by the DC power supply output (10) and a reference value fixed by a circuit (201). The output of the detection circuit (200) is connected via an isolation circuit (202) to a circuit (203) which controls the switching of the electronic switch (106).

The microcontroller (30) receives the control signals (301) for the motor unit's (2) operation according to at least one rotation speed and its two rotating directions. The microcontroller (30) has programming means designed to discriminate or recognize the control signals (301) received. For example, the control signals (301) come from an infrared signal decoding circuit (50), electrical contacts (51) and/or a control bus (52).

The operation of the control device (1) according to the invention stems directly from the preceding description.

As soon as a control signal (301) is detected by the microcontroller (30), the latter recognizes the signals in order to determine the motor unit's (2) rotation direction and the rotation speed. The microcontroller (30) selects a reference value by the circuit (201), so that the input of the detection circuit (200) is supplied at a value corresponding to that to be supplied to the motor (2), and the rotation speed of the latter corresponds to the speed given by the control signal. The circuit (200) then detects the difference existing between this reference value and the value of the electrical output magnitude of the DC power supply (10). The detection circuit (200) controls the control circuit (203) via circuit (202), so that the circuit (203) activates the electronic switch (106), and the output magnitude of the DC power supply reaches a value equal to that of the reference magnitude. The control circuit (203) modifies the switch's (106) switching frequency to obtain a value at the DC power supply output (10) equal to the reference value. At the same time the speed detection is executed, the microcontroller (30) sends a signal to the control unit (40) via line (31), giving the rotation direction of the motor unit (2), and a reading of the motor current via line (32), to allow the latter to rotate at the selected speed.

According to an advantageous characteristic of the invention, the microcontroller (30) is capable of receiving control signals (301) corresponding to at least two of the motor unit's rotation speeds. Depending on the signal received, the microcontroller (30) then selects, via circuit (201) a reference value among two values, corresponding, respectively, to a slow speed and fast speed of the motor unit. For example, the reference values may be of the order of 12 volts and 24 volts, in order to obtain, respectively, a slow rotation speed and fast rotation speed of the motor unit. This type of control can advantageously be used to control a Venetian blind with orientable slats. For such an application, use of a high rotation speed may be anticipated to open or close the screening element and use of a low rotation speed to orient the slats, for example. The device according to the invention therefore offers the advantage of being able to control a single motor unit (2) according to at least two rotation speeds and according to its two rotation directions. Of course, it may be considered that the microcontroller (30) fixes, in relation to the control signals received, an additional reference value corresponding to a watch mode for the power supply to prevent a design runaway of the power supply. Such a reference value may be about 8 volts.

In the example described above, the motor control unit (40) is powered by a voltage which may have different values, each corresponding to one rotation speed. According to this example, unit (40) is powered by a constant current reading, regardless of the value of the power supply's (10) output voltage. Of course, it could be considered that the microcontroller (30) determines a fixed value for the DC power supply (10) output voltage and produces a current reading of different values, in order to obtain a different rotation speed for the motor (2).

Figure 2:
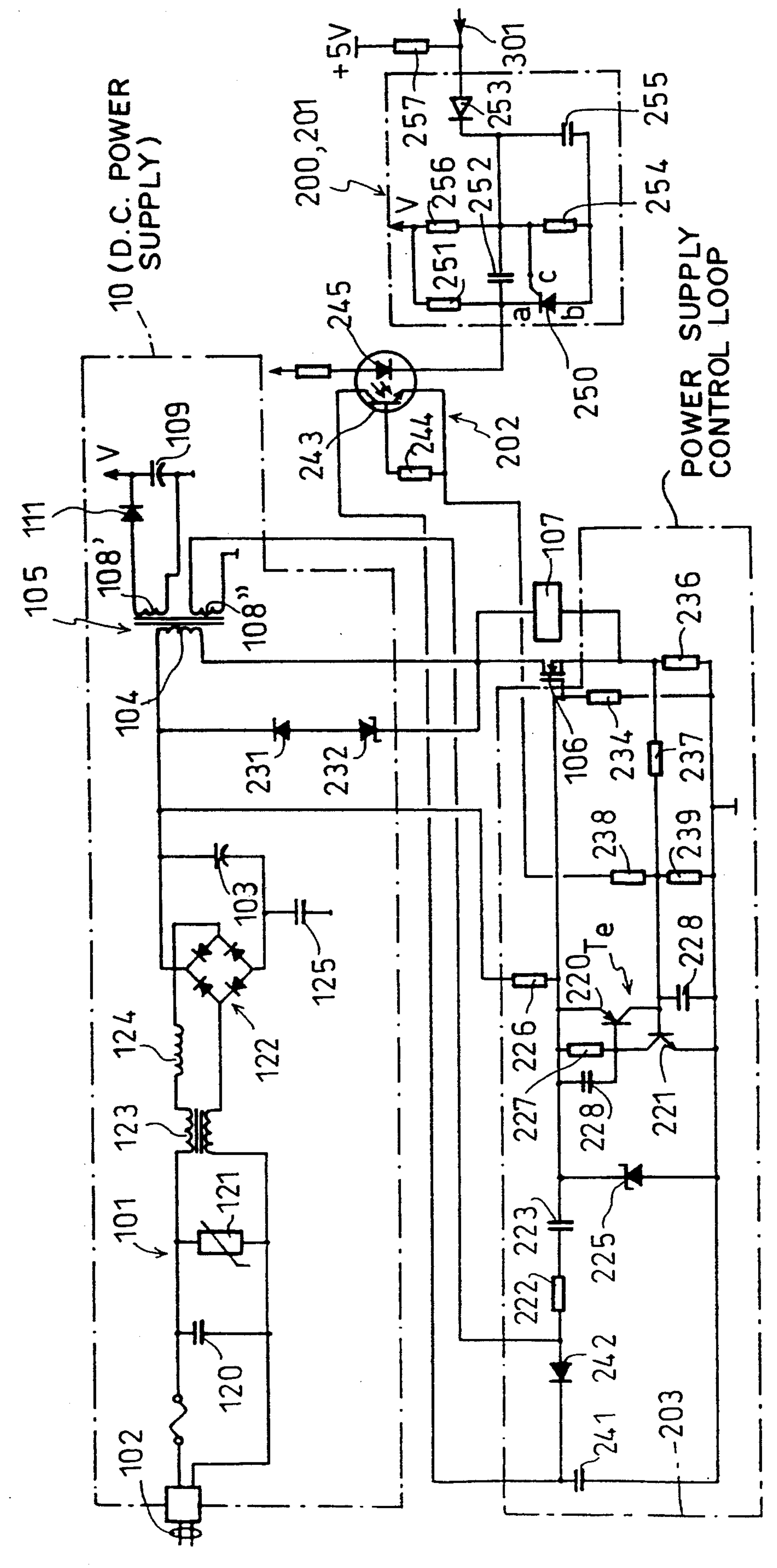
FIGS. 2 and 3 are diagrams illustrating one embodiment of the control device according to the invention.
Figure 3:
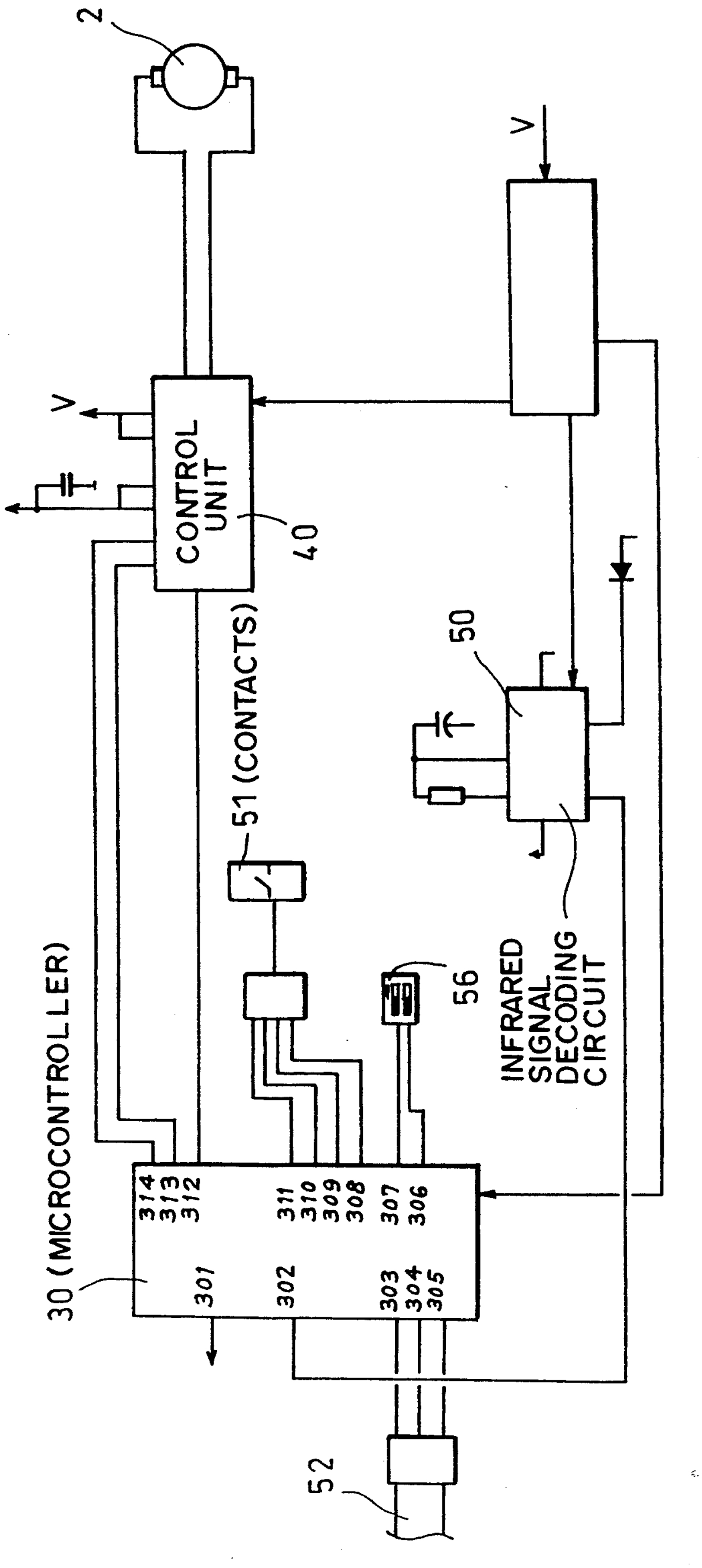

FIGS. 2 and 3 illustrate one embodiment of a control device (1) according to the invention.

The DC power supply (10) comprises a filter (101) made up of a capacitor (120) and varistor (121). The varistor (121) is linked to a diode rectifier bridge (122) by means of a double coil (123) and a coil (124). The output of the rectifier stage (122) is connected to the terminals of the capacitor (103) and to one of the armatures of a capacitor (125), the other armature of which is grounded. In the illustrated example, the transformer (105) comprises a first secondary winding (108'), which produces at the output of the rectifier diode (111) a regulated output V at the capacitor's (109) terminals.

The transformer (105) also comprises a second secondary winding (108") used to perform a counterpolarization of the switch's (106) control circuit (203). The circuit (203) comprises two transistors (220, 221) installed to form an equivalent thyristor Te. The transistor's (220) transmitter, type PNP, is linked to the secondary winding (108") via a resistor (222) serial-connected with a capacitor (223) which removes the DC component of the signal. The common point, between the capacitor (223) and transistor's (220) transmitter, is grounded via a diode (225) which protects the transistor's (106) gatesource function and is connected to the transformer's (104) primary winding via a resistor (226).

The transitor's (220) transmitter is also connected to its base, via a bias resistor (227) parallel-connected with a filtering capacitor (228). The base of the transistor (220) is connected to the transitor's (221) collector, type NPN. The transistor's (221) transmitter is grounded, whereas its base is connected to the transistor's collector (220) and is grounded by means of a signal filtering and shaping capacitor (228).

The transistor's (220) transmitter activates the gate of the switch (106) formed from a field effect transistor whose drain is connected to the terminals of the primary winding (104) by means of a pair of diodes (231, 232) serial-connected and parallel-connected to the primary winding (104). The transistor's gate (106) is grounded via resistor (234), whereas the switching support circuit (107) is placed between the drain and source. The transistor's (106) source is grounded by the resistor (236) giving an image of the current circulating in the primary winding (104) and is connected to the transistor's (221) base via resistor (237).

The transistor's (221) base is connected at the midpoint of a divider bridge (238, 239) placed between the ground and one of the output terminals of the isolation circuit (202). The other output terminal of the circuit (202) is powered by the secondary winding (108") by means of a half-wave rectifier circuit formed of a capacitor (241) and a diode (242). In the illustrated example, the output terminals of the circuit (202) are formed from the collector and transmitter of a phototransistor (243) whose base is connected to the transmitter by a resistor (244).

The input stage of the opto-coupler (202) comprises a photodiode (245) crossed by a current coming from the amplifier (200) and the reference circuit (201). Advantageously, the functions of circuits (200) and (201) are provided around the same circuit (250). The circuit (201) comprises a component (250) whose terminal a is connected to the photodiode (245) under a positive voltage by resistor (251) and, by a coupling capacitor (252), to the cathode of a diode (253). A resistive (254) and capacitive (255) parallel stage is mounted between terminals b and c of component (250). Terminal c of component (250) is connected to the cathode of the diode (253) which is connected to the terminal (301) of the microcontroller (30) and to a resistor (257) which is itself connected to the 5-volt power supply of the logic circuits.

The voltage at the terminals of the resistor (254) depends on the voltage V via resistor (256) and the 5-volt voltage via the resistor (257) and diode (253). The voltage at the terminals of the resistor (254) varies with the signal given at the output (301) of the microcontroller and the value of the voltage V. The component (250), marketed under reference TL 431, causes the current absorbed between its terminals a and b to vary and obtain, for example, a 2.5-volt voltage between its terminals c and b. The current circulating from a to b partially crosses the optocoupler's diode (245), the other part of the current coming from the voltage V via the resistor (251).

It is thus possible to amplify the difference between the reference voltage (2.5 volts) set during the design stage by the component and the image of the voltage V which is modified by the microcontroller (30) as a function of the desired speed.

As shown more specifically in FIG. 3, the microcontroller (30), marketed by the NEC Company under Reference 75 P 56 CS 011, has a switching terminal (302) connected to the infrared signal decoding circuit (50). For example, the decoding circuit may be formed from a box marketed by the NEC Company under Reference MPC 2800. The microcontroller (30) is capable of accommodating at its terminals (303) (305) control signals from the communication bus (52). The selection of an address or code assigned to the microcontroller (30) is made by the electrical contacts (56) connected to the microcontroller's output ports (306, 307). The output ports (308 to 311) are connected to contacts (51) making it possible to select the rotation direction of the motor unit and two rotation speeds. Preferably, the contacts (51) can form a part of a floating cable pushbutton type of switch.

The microcontroller (30) is capable of driving the control unit (40) of the motor unit. Advantageously, the unit (40) is made up of a DC—DC switching converter formed of a PBL 3717/3 package marketed by the UNITRODE Company. Through its output terminal (312), the microcontroller (30) feeds the rotation direction of the motor unit to the converter (40) and through its terminals (313, 314), it feeds the current reading for powering the motor (2). Moreover, the converter (40) is powered by the output voltage V of the DC power supply (10).

The operation of the embodiment example of the device according to the invention is the following.

When a control signal, supplied either by the control bus (52), the dry contacts (51) or infrared reception circuit (50), is detected and discriminated by the microcontroller (30), the latter transmits through its output (301) a reference voltage signal corresponding to the desired motor unit (2) speed. The circuit (200, 201) injects a current into the diode (245) as a function of the control signal and voltage V value.

The transistor (221) is crossed by an increasing current which is the image of the current of the primary stage of the transformer (104) and current delivered by the optocoupler (202). As soon as the transistor (221) reaches its saturation point, the transitor (106) gate voltage is reduced to zero. The current flow into the primary winding (104) is then interrupted. The transistor (105) then acts like a self, so that the energy is transmitted to the secondary stage (108′, 108″) of the transformer. During this transmission, a pulse appears on the secondary winding (108″) which counterpolarizes the equivalent thyristor (te), thereby releasing the transistor (226) gate. The conduction threshold of the equivalent thrysistor (Te) depends on the current circulating in the transistor (106) and the current from the optocoupler (202). The current circulating in the transistor (106) increases until the thyristor (Te) reaches its conduction threshold. Transistors (220) and (221) are then saturated, which opens the transistor (106).

The transistor (106) is thus controlled when increasing or decreasing its switching frequency, in order to respectively increase or decrease the output voltage V of the DC power supply.

The DC converter (40) controls the operation of the motor (2) according to a speed corresponding to the value V of the power supply voltage. It is noted that the implementation of the converter (40) makes it possible to limit the motor's power supply current, notably at the time it is started.

The control device according to the invention makes it possible to control a single motor unit according to at least one rotation speed and its rotation directions. Moreover, the control device according to the invention has a small overall dimension, so that it seems possible to insert it either inside the winding enclosure of the screening element or inside the internal volume of a control switch, without changing the standard dimensions of the enclosures and switches.

The invention is not limited to the examples described and depicted, as various modifications can be made to them without deviating from its scope.

We claim:

1. A control device for controlling a motor which is operable in at least one rotational speed and two rotational directions and which motor is connected to a screening element, the device comprising; means for racelying control signals to operate the motor in said at least one rotational speed and in the two rotational directions, discrimination means for discriminating the control signals received, a motor control unit controlled by said discrimination means, a power supply with at least one electronic switch controlled by a control circuit so as to feed a regulated electrical output to said motor control unit, means for connecting the motor control unit to the motor, means for regulating the power supply, means for selecting a reference value of an electrical output to be supplied by the power supply to said motor control unit, said means for regulating the power supply including a detection circuit for detecting a difference appearing between the value of the regulated electrical output produced by said power supply and said reference value of an electrical output to be supplied by the power supply, said detection circuit being connected to control said control circuit of said at least one electronic switch so that the output of the power supply reaches a value equal to that of the reference value, and said selection means selecting the reference value of the electrical output as a function of the control signals received.

2. The control device of claim 1 in which said selection means selects said reference value among at least two values corresponding, respectively, to a rapid and slow motor rotational speed.

3. The control device of claim 2 in which said selection means selects an additional reference value corresponding to a power supply watch mode.

4. The control device of claim 2 in which said power supply is a DC power supply source producing a regulated variable electrical voltage which is supplied to said control unit corresponding to the rapid or slow motor rotational speed.

5. The control device of claim 4 in which said control unit includes a DC switching converter which is connected so as to switch the DC power supply depending upon the reference value selected by said selection means.

6. The control device of claim 2 in which the power supply is a DC power supply source which produces an electrical voltage with a fixed value which is supplied to the control unit so that said control unit produces at least two power current values corresponding to the rapid or slow motor rotational speeds.

7. The control device of claim 1 in which said means for receiving control signals and said discrimination means for discriminating the control signals received are formed as a microcontroller which is connected to said motor control unit.

8. The control device of claim 7 in which said control signals are received from a transmitter which transmits infrared signals, circuit means for monitoring said infrared signals and means for connecting said circuit means to said microcontroller.

9. The control device of claim 7 in which said control signals are provided to said microcontroller through contacts of an electrical switch connected thereto.

10. The control device of claim 7 in which said microcontroller is connected to a group of switches which are operable to select a code assigned to the motor and which microcontroller is also connected to a control bus.

* * * * *